Patented Dec. 12, 1922.

1,438,387

UNITED STATES PATENT OFFICE.

EDWARD BRADFORD MAXTED, OF WALLSALL, ENGLAND, ASSIGNOR TO JOHN THOMPSON (GAS DEVELOPMENTS) LIMITED, OF WOLVERHAMPTON, ENGLAND.

MANUFACTURE OF HYDROGEN.

No Drawing. Application filed August 22, 1921. Serial No. 494,402.

(GRANTED UNDER THE PROVISIONS OF THE ACT OF MARCH 3, 1921, 41 STAT. L., 1313.)

*To all whom it may concern:*

Be it known that I, EDWARD BRADFORD MAXTED, a subject of the King of Great Britain, residing at 63 Highgate Road, Wallsall, in the county of Stafford, England, have invented certain new and useful Improvements in the Manufacture of Hydrogen (for which I have filed applications in Great Britain, No. 125,112, dated the 22nd of May, 1906, Spain, No. 766, dated the 31st of December, 1920, and India, No. 6,940, dated the 3rd of May, 1921), of which the following is a specification.

This invention relates to improvements in the manufacture of hydrogen by the well known method in which an oxide of iron maintained at a red heat is alternately reduced to the metallic condition by means of a reducing gas and re-oxidized by means of steam, hydrogen being evolved during the steaming operation.

In the above process, as usually carried out, the reducing gases commonly employed may be divided into two classes:—(1) those of high reducing and calorific power, such as water gas, which contain up to five or six per cent of carbon dioxide and only small quantities of diluents such as nitrogen, the bulk of the gas being composed of hydrogen and carbon monoxide, and (2) gases of low reducing and calorific value, such as Mond gas or producer gas, containing a large percentage of diluents such as nitrogen, often up to forty or fifty per cent, together with up to fifteen or sixteen per cent of carbon dioxide. The present process employs gas of high reducing and calorific power, modified as compared with the ordinary reducing gas of this type so as to enable the purity of the hydrogen obtained to be substantially increased by the reduction of the proportion of carbon monoxide commonly found in hydrogen produced by the usual iron oxide method.

According to this invention, I employ as the reducing gas a gas of high reducing and calorific power containing less than ten per cent by volume of a diluent such as nitrogen and more than ten per cent of carbon dioxide, the remainder of the gas consisting essentially of carbon monoxide and hydrogen, the volume of the carbon monoxide being not substantially less than that of the dioxide. It is found that by adding carbon dioxide to a highly reducing gas the effect on the iron oxide is such that the amount of carbon monoxide obtained during the steaming operation is substantially reduced and this is a matter of considerable importance even in cases where pure hydrogen is not required, owing to the highly poisonous nature of the carbon monoxide. It is not proposed, according to the present invention, to employ a reducing gas in which the carbon dioxide is present in substantially larger proportions than the carbon monoxide (in fact, the monoxide may considerably exceed the dioxide in quantity) or in such proportions as to prevent completely the deposition of carbon from the reducing gas on the iron, and the production of chemically pure hydrogen is not aimed at. What is obtained, however, in an economical manner, is hydrogen of considerably better quality than that produced by means of the ordinary reducing gas of high calorific power, such as water gas. It is found that, in general, under the ordinary conditions of working, the smaller the monoxide-dioxide ratio in the reducing gas the purer is the hydrogen produced on steaming.

In order to manufacture reducing gas of the nature necessary for the above invention, we either take water gas, or other commercial reducing gas containing less than 10 per cent of carbon dioxide but otherwise conforming to the condition set forth in the present specification, and mix with it sufficient carbon dioxide to bring up the percentage of carbon dioxide to more than ten per cent, or we modify the method of manufacture of the water gas in such a way that more than ten per cent of carbon dioxide is contained in the gas produced, for instance by the use of excess of steam, or by employing a lower temperature in the water gas generator itself, or by allowing the gases after leaving the incandescent coke to pass through a zone at a lower temperature, say from 400–800° C. filled with suitable reactive material, for instance iron oxide.

It is important, in order that the maximum yield of hydrogen should be obtained, that the reducing gas used should contain as small as possible a percentage of diluting gases such as nitrogen and still more important that oxidizing gases such as air or steam in appreciable proportions should be absent. Reducing gases the carbon dioxide content of which has been raised by partial combustion with air or by admixture with steam in the hydrogen retort as has already been proposed are therefore totally unsuited for the present process. The reduction of the iron oxide to the metallic condition by means of the reducing gas is carried out at a red heat and is followed by oxidation of the resulting iron with steam in the well known manner, the method of carrying out the entire process being substantially similar to the usual alternating reduction and oxidation method.

While it is essential, according to this invention, that the carbon dioxide content of the reducing gas employed should be greater than ten per cent of the volume of the total gas mixture, it is not intended to employ a reducing gas in which the carbon dioxide is substantially in excess of the carbon monoxide; my prior Patent No. 1,253,622, covering the use of a gas of the latter type for the purpose of obtaining hydrogen of a very high degree of purity.

What I claim and desire to secure by Letters Patent of the United States is:—

1. A process for the manufacture of hydrogen by the alternate reduction of iron oxide and reoxidation by steam which consists in reducing the iron oxide by a reducing gas free from steam which gas contains less than ten per cent by volume of a diluent (such as nitrogen) and more than ten per cent of carbon dioxide and as to the remainder substantially consists of carbon monoxide and hydrogen, in such proportions that the carbon dioxide is not in any substantial excess of the carbon monoxide, and in thereupon reoxidizing the reduced iron by the steam so as to liberate the hydrogen in the steam.

2. A process for the manufacture of hydrogen by the alternate reduction of iron oxide and reoxidation by steam which consists in reducing the iron oxide by a reducing gas free from steam which gas contains less than ten per cent by volume of a diluent (such as nitrogen) and more than ten per cent of carbon dioxide and as to the remainder substantially consists of carbon monoxide and hydrogen, in such proportions that the carbon monoxide is in excess of the dioxide, and in thereupon reoxidizing the reduced iron by the steam so as to liberate the hydrogen in the steam.

EDWARD BRADFORD MAXTED.